United States Patent [19]

Kim

[11] Patent Number: 4,824,881

[45] Date of Patent: Apr. 25, 1989

[54] METHOD FOR MAKING POLYAMIDE ANION SOLUTIONS

[75] Inventor: Young H. Kim, Wilmington, Del.

[73] Assignee: E. I. Du Pont de Nemours and Company, Wilmington, Del.

[21] Appl. No.: 143,833

[22] Filed: Jan. 14, 1988

[51] Int. Cl.$^4$ .......................... C08K 5/41; C08L 77/10
[52] U.S. Cl. .................................. 524/82; 524/84; 524/173; 524/606
[58] Field of Search ................... 524/82, 84, 173, 606, 524/607

[56] References Cited

U.S. PATENT DOCUMENTS 4,228,218  10/1980  Takayanagi et al. ................ 525/58

FOREIGN PATENT DOCUMENTS

| | | |
|---|---|---|
| 5116727 | 9/1980 | Japan . |
| 57-47351 | 3/1982 | Japan . |
| 57-61011 | 4/1982 | Japan . |
| 57-19851 | 7/1982 | Japan . |
| 57-195136 | 11/1982 | Japan . |
| 58-7426 | 1/1983 | Japan . |
| 59-223752 | 12/1984 | Japan . |
| 61-194273 | 8/1986 | Japan . |
| 62-6975 | 1/1987 | Japan . |

OTHER PUBLICATIONS

Corey et al., J. Am. Chem. Soc., 87, 1345 to 1353, (1965).

Takayanagi and Katayose, J. Poly. Sci. (Polymer Chemistry Edition) 19, 1133 to 1145 (1981).

Takayanagi et al., Journal of Polymer Science, Polymer Chemistry Edition, vol. 21, 31 to 39 (1983).

Ogata et al., Journal of Polymer Science, Polymer Chemistry Edition, vol. 22, 865 to 867 (1984).

Takayanagi et al., Journal of Applied Polymer Science, vol. 29, 141 to 151 (1984).

Takayanagi et al., J. Macromol. Sci.-Phys., B17(4), 591 to 615 (1980).

Takayanagi et al., Journal of Applied Polymer Science, vol. 29, 2057 to 2067 (1984) and 2547 to 2559, and vol. 27, 3903 to 3917 (1982).

Bodaghi et al., Polymer Engineering and Science, 24, 242 to 251 (1984).

Takayanagi, Pure and Appl. Chem., 55, 819 to 832 (1983).

Moore and Mathias, in J. of Applied Polymer Science, 32, 6299 to 6315 (1986).

Yamada et al., J. Appl. Polym. Sci., 32, 5231 (1986).

Flood et al., J. Appl. Polym. Sci., 27, 2965 (1982).

Aoki et al., Polymer Engineering and Science, 20, 221 (1980).

*Primary Examiner*—C. Warren Ivy
*Attorney, Agent, or Firm*—James A. Costello

[57] ABSTRACT

Deprotonation of polyamides employing alkoxide and/or alkali amide bases in solution in a liquid sulfoxide, the solutions being useful to make N-alkylated and N-acylated derivatives and to fabricate polyamide films, fibers, coatings, manufactured articles, and the like.

20 Claims, No Drawings

METHOD FOR MAKING POLYAMIDE ANION SOLUTIONS

BACKGROUND OF THE INVENTION

It is known that sodium hydride reacts with dimethylsulfoxide under anhydrous conditions with evolution of hydrogen to provide the so-called "dimsyl" anion. The dimsyl anion can be used to remove protons from a variety of compounds such as amines, amides, acetylenes and weakly acid hydrocarbons. Typical reactions have been described by Corey et al., J. Am. Chem. Soc., 87, 1345 to 1353, 1965, among others. Takayanagi et al. have extended the reaction of the dimsyl anion with amides to relatively low molecular weight aromatic polyamides and have used the amide anion thus formed to produce a variety of N-substituted products; see, J. Poly. Sci. (Polymer Chemistry Edition) 19, 1133 to 1145 (1981). Other background publications include the following:

Takayanagi et al., Journal of Polymer Science, Polymer Chemistry Edition, Vol. 21, 31 to 39 (1983);

Ogata et al., Journal of Polymer Science, Polymer Chemistry Edition, Vol. 22, 865 to 867 (1984);

Takayanagi et al., Journal of Applied Polymer Science, Vol. 29, 141 to 151 (1984);

Takayanagi et al., J. Macromol. Sci.-Phys., B17(4), 591 to 615 (1980);

Takayanagi et al., Journal of Applied Polymer Science, Vol. 29, 2057 to 2067 (1984) and 2547 to 2559, and Vol. 27, 3903 to 3917 (1982);

Bodaghi et al., Polymer Engineering and Science, 24, 242 to 251 (1984);

Takayanagi, Pure and Appl. Chem., 55, 819 to 832 (1983);

Moore and Mathias, in J. of Applied Polymer Science, 32, 6299 to 6315 (1986);

Takayanagi and Katayose, in J. Polym. Sci., Polym. Chem. Ed., 19, 1133 to 1145 (1981);

Japanese patent publications 57/195136, 58/7426, 59/223752, 61/194273 and 62/6975; U.S. Pat. No. 4,228,218; Yamada et al., J. Appl. Polym. Sci., 32, 5231 (1986); Flood et al., J. Appl. Polym. Sci., 27, 2965 (1982); and Aoki et al., Polymer Engineering and Science, 20, 221 (1980).

Aromatic polyamides are known to be soluble in sulfuric acid and hydrogen fluoride. However, the corrosivity of such solvents together with other factors attendant upon their use have combined to limit somewhat the development of commercial uses for the aromatic polyamides. With solvent systems such as amide-salt combinations, e.g., dimethylacetamide/lithium chloride, high salt levels are necessary to achieve concentrated polymer solutions. This, in turn, may affect utilization of these solutions for certain applications.

SUMMARY OF THE INVENTION

This invention concerns a method for making a polyamide anion in solution in a liquid sulfoxide, the method comprising reacting the polyamide with a base selected from at least one member of the group: (i) an alkoxide of the formula $C_xH_{2x+1}O^-M^+$ wherein $x = 1$ to 7 and M is selected from Li, Na, K, Rb and Cs, and (ii) an alkali amide of the formula $R_1R_2N^-M^+$, wherein M is as defined in (i) and one or both of $R_1$ and $R_2$ are selected from hydrogen, $C_1$ to $C_7$ alkyl and trialkylsilyl, whereby the base removes a proton from the polyamide to form the polyamide anion.

In general, group (i) and group (ii) bases having pKa values of about 19 and above, in dimethyl sulfoxide (DMSO), will be useful in the practice of this invention. Preferred bases from group (i) are the tertiary alkoxides such as potassium t-butoxide. A preferred base from group (ii) is sodium amide.

The polymers are dissolved in sulfoxide containing base (i) and/or base (ii). The base acts to remove a proton from the polymer and results in stable polymer solutions of the resulting anionic form of the polymer. Contemplated polymers are polyamides having the repeating unit

—NHRCO— wherein:
R is selected from $R^3$ and $R^1NHCOR^2$,
$R^1$ and $R^3$, individually, are selected from m-phenylene, p-phenylene, 3,3'-biphenylene, 3,4'-biphenylene and 4,4'-biphenylene,
$R^2$ is selected from $R^1$ and $-(CH_2)_x-$ and x is 1 to 10, preferably 1 to 4.

The repeating unit as described can be substituted with one or more additional substituents that do not interfere with solution formation as described herein. Preferred among these optional substituents are halogen, most preferably chlorine and bromine, and $C_xH_{2x+1}$ wherein x is 1 to 10. Should dissolution of the polymer appear sluggish, as may happen when lithium dialkylamide is the base, an assisting solvent can be employed. The assisting solvent can be one or both of formamide and benzamide.

When the polymer comprises repeating units of $R^3$ solely, it can be characterized as a homopolymer. Homopolymers are also formed when $R^1$ and $R^2$ are the same throughout the polymer. Copolymers result when $R^1$ and/or $R^2$ vary within the polymer matrix. It is also comtemplated that relatively minor amounts of aliphatic components can be present with the aromatic moieties so long as they do not adversely affect solution stability or film-formability.

Articles of manufacture can be made from the polymer solutions of this invention by removing the polymer from solution, e.g., by precipitation or by concentrating the solution to solidify the polymer, then converting the polymer to a formable mass and shaping it to the desired geometry. The articles are characterized by physical and chemical profiles reflective of the novel polymer solutions from which they are made.

N-alkylated and N-acylated polymer derivatives are made in a conventional reaction of the polymer, in solution, with an alkyl or acyl halide or tosylate. The preferred halogens are Cl, Br, and I. As demonstrated by their high nucleophilic reactivities, polymer anions made by the method of this invention are characterized by substantially complete removal of protons from the nitrogen atoms.

DETAILS OF THE INVENTION

The Polymers

Contemplated polymers include aromatic polyamides containing the —NH— function as part of the polymer unit. Useful aromatic polyamides are described in U.S. Pat. Nos. 3,869,429 and 4,075,172. Polymers should have at least a film-forming molecular weight, preferably a weight average molecular weight of about 2500 or more. Preferred molecular weights are about 3300 or more, indicated by an inherent viscosity of about 0.4 or greater measured at 0.5% concentration in concentrated (95% to 98%) sulfuric acid at 30° C. Contemplated polymers include poly(paraphenylene terephthalamide), poly(metaphenylene isophthalamide), poly(parabenzamide), poly(4,4'-biphenylene isophthalamide), poly(chloroparaphenylene isophthalamide) and copolymers thereof. The polymers contemplated for use in this invention are soluble only with great difficulty in typical solvent systems known heretofore.

The Solvent System and Solutions

Liquid sulfoxides that are useful as solvents in the practice of this invention include the following:

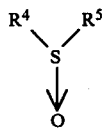

where $R^4$ and $R^5$, which can be the same or different, are alkyl of three or fewer carbon atoms, and can be combined with the sulfoxide group to form a cyclo aliphatic ring. Preferred are dimethylsulfoxide (DMSO) and tetrahydrothiophene oxide (THTO). Minor amounts of other organic so-solvents, such as dimethylformamide (DMF), dimethylacetamide (DMA), and N-methylpyrrolidone (NMP), which do not precipitate the polymer anion, can also be employed.

The aromatic polyamides are converted to homogeneous solutions of the corresponding anion in the sulfoxide by reacting them with the bases disclosed herein. The deprotonated polyamide solutions can be prepared with a solids content up to about 3.5 weight percent. Solutions with a higher polymer content, up to 15 weight percent and more, can be obtained by evaporating the solvent under vacuum or by freeze-drying. The solutions can be purified by filtering and the concentration can be determined by reprecipitation.

To prepare solutions of polymer, it is necessary only to contact the polymer with the components which form the solvent system. The order of addition is not critical although the solvent system is usually made up before immersion of the polymer to be dissolved. It would be acceptable, however, to disperse the polymer to be dissolved in the sulfoxide solvent component and then add base to that dispersion.

The solutions are preferably prepared at temperatures less than 50° C. since prolonged exposure at higher temperatures may result in reduction in molecular weight. The degree of degradation, of course, depends on polymer structure. Little degradation of poly(paraphenylene terephthalamide) anion solutions occurs on prolonged storage at ambient temperatures.

The amount of polymer which can be dissolved by the instant solvent system is a function of ability to handle the generated solution viscosity. In this regard, extended chain polymers, such as poly(paraphenylene terephthalamide) provide higher solution viscosities at equivalent concentrations and molecular weights vs. flexible chain polymers, such as poly(metaphenylene isophthalamide). Concentrations of polymer attainable in the solutions will vary with the polymer structure, and with molecular weight as determined by inherent viscosity.

One skilled in the art will be able to fabricate a wide range of useful articles from the solutions of this invention, including films, fibers, coatings, coated and encapulated materials and the like. With respect to films, their preparation from the instant solutions will insure excellent physical and chemical properties. Such properties include low salt content, good temperature stability and uniformity. Films of either polyamide or polyamide anion can be prepared as follows.

(i) quenching in protic solvent produces polyamide film;

(ii) quenching in non-protic solvent produces polyamide anion film;

(iii) evaporation of the sulfoxide produces polyamide anion film; and (iv) polyamide anion film contacted with a protic solvent will produce a polyamide film.

Polyamide anion solutions can be used as dopes for fiber-spinning either by dry-spinning techniques or by dry jet-wet spinning processes. Polyamide anion/sulfoxide solutions can also be used for the preparation of polymer coatings. The advantage in using these solutions for coatings is the noncorrosive solvent. This makes possible the coating and encapulating of a variety of substrates normally attacked by sulfuric acid or HF. Articles made from the solutions of this invention have several distinguishing characteristics, including good homogeneity, and good color and thermal and mechanical properties.

The following Examples illustrate the invention. The polymers used in the Examples had an inherent viscosity above about 3.

EXAMPLE 1

To 11.91 g of poly(m-phenylenediamine isophthalamide) in 100 ml of DMSO was added 13.82 g of potassium t-butoxide at room temperature. A greenish yellow solution was obtained after overnight stirring at room temperature. When 2 ml of allylbromide was added to this solution, it became clearer but more colored. A total of 10 ml of allylbromide was added. The temperature increased to 75° C. and precipitation occurred during the addition of allylbromide. The mixture was poured into water and the precipitate was filtered. IR analysis showed no band at 1540 cm$^{-1}$ for N-H indicating complete formation of the anion and complete allylation. Tg=139.5° C.

EXAMPLE 2

To 32 g of poly(p-phenylenediamine terephthalamide) pulp (inh vis=5.5) in 1.6 L of anhydrous DMSO under nitrogen was added 37.31 g of potassium t-butoxide at once. The clear red solution was stirred overnight. A volume of 800 ml of the solution was transferred into another flask under nitrogen. To this was added 30 ml of allylbromide. Within one minute the solution turned yellow and the viscosity dropped. The solution was poured into water, and the precipitate was filtered and dried under vacuum. H NMR (90 MHz, CDCl13): 4.4 (broad, 2H, allylic), 5.0 (d, 1H, antiterminal vinyl), 5.2 (s, 1H, syn vinyl), 6.8 (s, 2H, aromatic connected to N), 7.1 (s, 2H, aromatic connected to carbonyl). C NMR (75.6 MHz, CDCl13): 52.8, 117.9, 127.9, 128.2, 132.4, 137.7, 141.3, 169.1.

EXAMPLE 3

To 200 ml of DMSO was added 1.19 g of poly(p-benzamide) (inh vis=1.67) and 1.46 g of potassium t-butoxide at room temperature. The solution was stirred for 15 hours. Allylbromide was added to the yellow solution which was then stirred overnight. The solution was quenched in water to give white powdery product. NMR (360 MHz, THF, TMS standard) 4.4 (b, 2H, 5.1 (b, 2H), 5.7 (b, 1H), 6.5-8.0 (b, 4H).

EXAMPLE 4

To a vial containing 0.119 g of vacuum-dried poly(p-phenylenediamine terephthalamide) was added 9 ml of DMSO, followed by 0.039 g of $NaNH_2$ in 1 ml of DMSO in a dry box under nitrogen atmosphere. The polymer dissolved in about 5 minutes, giving a red viscous solution. The solution was stirred for 4 hrs, then 0.4 ml of allyl bromide was added. The vial was taken out of the dry box, then the solution was poured into 120 ml of water and filtered through a cellulose membrane filter (0.45μ). After the polymer was dried in a vacuum oven at 80° C., it was stirred in 10 ml of $CH_2Cl_2$ for 30 minutes, then filtered through a membrane filter. The filtrate was evaporated under vacuum. Total N-allyl PPD-T amounted to 0.138 g.

EXAMPLE 5

To a vial containing 0.119 g of vacuum-dried poly)p-phenylenediamine terephthalamide) was added 9 ml of DMSO, followed by 0.051 g of lithium dimethylamide in 1 ml of DMSO in a dry box under nitrogen. There was no dissolution in a 4-hr period. To the mixture was then added 90 mg of formamide and the polymer dissolved to form a red viscous homogeneous solution.

The embodiments of the invention in which an exclusive property or privilege is claimed are defined as follows:

1. A method for deprotonating an aromatic polyamide dissolved in a liquid sulfoxide, the method consisting essentially of reacting the polyamide with a base selected from at least one member of the group: (i) an alkoxide of the formula $C_xH_{2x+1}O^-M^+$ wherein x=1 to 7 and M is Li, Na, K, Rb or Cs, and (ii) an alkali amide of the formula $R_1R_2N^-M^+$, wherein M is as defined in (i) and $R_1$ and $R_2$ are selected from $C_1$ to $C_7$ alkyl and trialkylsilyl, said base having a pKa in dimethyl sulfoxide of about 19 or higher, thereby forming a polyamide anion solution, the polyamide having the repeating unit:

—NHRCO— wherein:

R is selected from $R^3$ and $R^1NHCOR^2$, $R^1$ and $R^3$, individually, are selected from m-phenylene, p-phenylene, 3,3'-biphenylene, 3,4'-biphenylene and 4,4'-biphenylene, $R^2$ is selected from $R^1$ and $(CH_2)_x$, and x is 1 to 10.

2. A method according to claim 1 wherein the polyamide is a homopolymer.

3. A method according to claim 2 wherein R is $R^3$.

4. A method according to claim 3 wherein $R^3$ is m-phenylene.

5. A method according to claim 3 wherein $R^3$ is p-phenylene.

6. A method according to claim 3 wherein $R^3$ is 3,3'-biphenylene.

7. A method according to claim 3 wherein $R^3$ is 3,4'-biphenylene.

8. A method according to claim 3 wherein $R^3$ is 4,4'-biphenylene.

9. A method according to claim 2 wherein R is $R^1NHCOR^2$.

10. A method according to claim 9 wherein $R^1$ and $R^2$, individually, are selected from the group m-phenylene, p-phenylene, 3,3'-biphenylene, 3,4'-biphenylene and 4,4'-biphenylene; $R^2$ additionally being selected from $CH_2—_x$.

11. A method according to claim 10 wherein $R^2$ is selected from $CH_2—_{1\ to\ 4}$.

12. A method according to claim 10 wherein $R^1=R^2$.

13. A method according to claim 10 wherein $R^1$ and $R^2$ are different.

14. A method according to claim 12 wherein $R^1$ and $R^2$ are p-phenylene.

15. A method according to claim 1 wherein the base is a tertiary alkoxide.

16. A method according to claim 15 wherein the base is potassium t-butoxide.

17. A method according to claim 1 wherein the base is an alkali amide.

18. A method according to claim 1 employing an assisting solvent selected from formamide and benzamide.

19. A method according to claim 18 wherein the assisting solvent is formamide.

20. A method according to claim 18 wherein the assisting solvent is benzamide.

* * * * *

UNITED STATES PATENT AND TRADEMARK OFFICE
CERTIFICATE OF CORRECTION

PATENT NO. : 4,824,881
DATED : April 25, 1989
INVENTOR(S) : Young H. Kim

It is certified that error appears in the above-identified patent and that said Letters Patent is hereby corrected as shown below:

On the title page:

Inventorship is corrected to read:

Young H. Kim and Wilfred Sweeny, both of Wilmington, Del.

Signed and Sealed this

Twenty-third Day of April, 1991

Attest:

HARRY F. MANBECK, JR.

*Attesting Officer*  *Commissioner of Patents and Trademarks*